United States Patent
Bendewald et al.

(10) Patent No.: US 8,910,086 B2
(45) Date of Patent: Dec. 9, 2014

(54) METHOD FOR CONTROLLING A GRAPHICAL USER INTERFACE AND OPERATING DEVICE FOR A GRAPHICAL USER INTERFACE

(75) Inventors: Lennart Bendewald, Wolfsburg (DE); Stefan Henze, Braunschweig (DE); Christoph Wäller, Braunschweig (DE); Volkmar Wagner, Berlin (DE); Frank Hauschild, Berlin (DE)

(73) Assignee: Volkswagen AG, Wolfsburg (DE)

( * ) Notice: Subject to any disclaimer, the term of this patent is extended or adjusted under 35 U.S.C. 154(b) by 414 days.

(21) Appl. No.: 13/264,110

(22) PCT Filed: May 28, 2010

(86) PCT No.: PCT/EP2010/057457
§ 371 (c)(1),
(2), (4) Date: Dec. 27, 2011

(87) PCT Pub. No.: WO2010/142543
PCT Pub. Date: Dec. 16, 2010

(65) Prior Publication Data
US 2012/0098768 A1    Apr. 26, 2012

(30) Foreign Application Priority Data
Jun. 12, 2009    (DE) .......................... 10 2009 024 656

(51) Int. Cl.
| G06F 3/033 | (2013.01) |
| G06F 3/041 | (2006.01) |
| B60K 35/00 | (2006.01) |
| B60K 37/06 | (2006.01) |
| G06F 3/0482 | (2013.01) |
| G06F 3/0488 | (2013.01) |

(52) U.S. Cl.
CPC ................. *B60K 35/00* (2013.01); *B60K 37/06* (2013.01); *G06F 3/0482* (2013.01); *G06F 3/04883* (2013.01); *B60K 2350/1004* (2013.01); *B60K 2350/1024* (2013.01); *G06F 2203/04808* (2013.01)
USPC ........................................... 715/863; 345/173

(58) Field of Classification Search
USPC .................... 345/173–178; 178/18.01–20.04; 715/863
See application file for complete search history.

(56) References Cited

U.S. PATENT DOCUMENTS

| 2006/0197753 A1 | 9/2006 | Hotelling |
| 2008/0058007 A1 | 3/2008 | Kang |

(Continued)

FOREIGN PATENT DOCUMENTS

| CA | 2480057 A1 | 10/2003 |
| DE | 3514438 C1 | 9/1986 |

(Continued)

OTHER PUBLICATIONS

Search Report and Written Opinion for International Patent Application No. PCT/EP2010/057457; Nov. 9, 2010.

*Primary Examiner* — Ryan A Lubit
(74) *Attorney, Agent, or Firm* — Barnes & Thornburg LLP

(57) ABSTRACT

A method for controlling a graphical user interface, wherein a menu is defined, in which several objects of the menu are each associated with a function, and a global input gesture is associated with at least a part of the objects, wherein the input gesture can be executed on a touch-sensitive surface of an input device and different display contents can be displayed on a display surface. In the method, a global input gesture executed on the touch-sensitive surface is captured and, independently of the currently rendered display content on the display surface, a function is executed, which is associated with the object that is associated with the captured input gesture. Further disclosed is an operating device for executing the method.

19 Claims, 3 Drawing Sheets

(56) References Cited

U.S. PATENT DOCUMENTS

2008/0143684 A1 6/2008 Seo
2009/0199130 A1* 8/2009 Tsern et al. .................... 345/173
2010/0073312 A1* 3/2010 Son et al. ...................... 345/173
2010/0238125 A1* 9/2010 Ronkainen ................... 345/173
2012/0144348 A1* 6/2012 Stone-Perez et al. ......... 715/863
2012/0194461 A1* 8/2012 Lim ............................. 345/173

FOREIGN PATENT DOCUMENTS

| DE | 19941956 A1 | 3/2001 |
| DE | 19941960 A1 | 3/2001 |
| DE | 102005020155 A1 | 11/2006 |
| DE | 202004021455 U1 | 3/2008 |
| EP | 1026041 A2 | 8/2000 |
| WO | 0208881 A2 | 1/2002 |

* cited by examiner

METHOD FOR CONTROLLING A GRAPHICAL USER INTERFACE AND OPERATING DEVICE FOR A GRAPHICAL USER INTERFACE

PRIORITY CLAIM

This patent application is a U.S. National Phase of International Patent Application No. PCT/EP2010/057457, filed 28 May 2010, which claims priority to German Patent Application No. 10 2009 024 656.8, filed 12 Jun. 2009, the disclosures of which are incorporated herein by reference in their entirety.

FIELD

Disclosed embodiments relate to a method for controlling a graphical user interface. Disclosed embodiments also relate to a control apparatus for a graphical user interface having a display apparatus which has a display area, and having a control apparatus by means of which the display contents which are shown on the display area can be controlled, wherein display contents relating to a menu can be produced by means of the control apparatus. The control apparatus furthermore comprises an input apparatus, which comprises a touch-sensitive surface. The method and the control apparatus are used in particular in a vehicle.

BACKGROUND

Originally, the various devices provided in a vehicle, in particular a motor vehicle, were operated via separate control elements. For example, there were rotary switches for adjusting the airflow and the temperature, switches for adjusting the various ventilation nozzles, switches for controlling the lighting devices for the interior of the vehicle, and control elements for a radio or CD player. Since then, in modern motor vehicles, so many devices are now provided for adjusting various vehicle functions, information systems, driver assistance systems and entertainment systems, that it is no longer expedient to provide separate control elements for all the vehicle devices. For this reason, the wide range of vehicle devices are controlled by means of a standard control concept with a small number of control elements which are operated in conjunction with a graphical user interface. In this case, the display apparatus displays switching areas which can be selected by the control element. For display purposes, the display apparatus may comprise a display, in which case, in a general form, a display means an apparatus for usual signaling of different information items. Normally, various forms of liquid crystal displays are used as the display. The display on the display apparatus can visually provide the driver with traffic-related or operation-related data for the vehicle. Furthermore, it can assist the driver in navigation, or in communication with the outside world. A so-called combination instrument is for this purpose arranged in the vicinity of the primary field of view of the driver. Normally, it is located in the dashboard behind the steering wheel, in which case it can be seen through an opening in the steering wheel. It is used in particular to display the speed, the fuel contents, the radiator temperature and other operation-related information items relating to the motor vehicle. Furthermore, radio and other audio functions can be displayed. Finally, menus can be displayed for telephone, navigation, telematics services and multimedia applications. The display furthermore assists the control of various further devices in the vehicle.

In addition to the combination instrument, a display apparatus is often arranged above the center console of the vehicle, via which further information items can be displayed. In particular, this display apparatus is used as a multifunction display and to display a geographic map from a navigation system. One such multifunction display is described, for example, in DE 199 41 956 A1.

The multifunction displays are operated in conjunction with a control system which may comprise various control elements. For example, a plurality of selection and function keys for controlling the vehicle devices are provided in DE 199 41 956 A1. On the other hand, DE 199 41 960 A1 describes a multifunction control element for selection of function groups and individual functions, which comprises a cylinder which can be rotated in both directions and can furthermore be moved at right angles to the rotation axis. EP 1 026 041 A2 describes a multifunction control unit for a motor vehicle. The control unit comprises a display and a function strip with function keys, which have fixed purposes, such as radio, on-board computer, telephone, navigation unit. When the function keys are operated, the display is assigned to the appropriate appliance, and the appliance causes its current operating status to be displayed on the display. Furthermore, freely programmable function keys are provided, possibly as well as function keys with a macro-command capability. These keys may be assigned by free programming to an appliance in the vehicle, which causes its respective operating status to be displayed on the display when the appropriate function key is operated.

Furthermore, DE 35 14 438 C1 discloses a central control input and information output for controlling a plurality of accessories which are installed in a vehicle. The input and output apparatus comprises a display unit and control keys which are unambiguously associated with the elements in the displayed menus. The elements in the menus indicate functions which can be initiated by the respective control keys. Menus for individual accessories can be selected via a basic menu, which can be displayed on the display. Furthermore, the system comprises additional control elements, by means of which specific basic functions of the central control input and information output, and accessories can be accessed at any time and independently of the instantaneously selected menu.

In addition to the stated control elements described above, it is also being proposed that the display itself be equipped with a touch-sensitive surface, thus providing a so-called touchscreen in this way. In the case of a touch screen such as this, the control action is carried out by the user using his fingertip, for example to touch the touchscreen. The position of the touch is detected, evaluated and associated with a control step. In order to assist the user in the control process, virtual switches can be displayed as graphical switching areas on the display. A display apparatus having a touch-sensitive surface which is used in conjunction with a navigation system is described, for example, in DE 10 2005 020 155 A1.

The display of information in a vehicle and the control of the wide range of devices in the vehicle are subject to very specific requirements. The information perception and control process are carried out in the vehicle inter alia by the driver. The information items should therefore be displayed in the vehicle such that the information perceived by the driver does not distract him while driving. The displayed information should therefore be detectable intuitively and quickly by the driver, in such a way that he has to divert his view away from the driving situation for only a very short time in order to perceive information. In the same way, it should be possible to control the vehicle devices as easily and intuitively as possible, thus allowing the driver to operate the devices even while driving. If the control process is assisted or guided by a display, the display should be produced such that the drive has to view the display only very briefly in order to carry out the control process.

In order to display the wide range of control and display operations clearly, hierarchical memory structures are frequently used. A menu shows various list entries or objects, and possibly graphics, graphical switching areas or icons associated with the list entries or objects. When a list entry or object is selected, a submenu is opened, with further list entries or objects. This structure can be continued through a plurality of hierarchy levels. Furthermore, a list entry or object can be associated with a specific display content rather than with a submenu, which display content represents the information associated with that list entry or object.

When using hierarchical menu structures in a vehicle, one problem that arises is that the navigation within these menu structures can lead to a driver being distracted. It is, therefore, desirable to develop control concepts for hierarchical menu structures, in which the navigation within the menu structure can be carried out quickly and intuitively by the driver.

SUMMARY

The disclosed embodiments provide a method and a control apparatus of the type mentioned initially by means of which the graphical user interface can be controlled quickly and easily, at least with respect to basic functions.

The disclosed embodiments provide a method having the features of claim 1, by a method having the features of claim 9, by a control apparatus having the features of claim 13, and by a control apparatus having the features of claim 14. Additional embodiments are specified in the dependent claims.

For the disclosed method, a menu is defined in which a function is associated with each of a plurality of objects in the menu. A global input gesture is in each case associated with at least some of the objects, wherein the input gesture can be carried out on a touch-sensitive surface of an input apparatus. Furthermore, various display contents can be displayed on a display area. In the disclosed method, a global input gesture which is carried out on the touch-sensitive surface is detected and a function which is associated with the object, which is in turn associated with the detected input gesture, is carried out independently of the display content being shown on the display area at that time.

For the purposes of the present disclosure, a global input gesture means that the input gesture is interpreted in the same way in all the menus. A global input gesture is always used for the same function, irrespective of what display content is being displayed at that time. For example, the function can stipulate that a specific object in a specific menu should always be called up. A global input gesture therefore differs from inputs which are associated with a specific function depending on the display content at that time. When a switching area is displayed, for example, in a menu, then a function is associated with the touching of the touch-sensitive surface in the area of this switching area, which depends on the information content shown in the switching area. A global input gesture is always interpreted in the same way, and is associated with a specific function, irrespective of such local switching areas. However, the function may also relate to the display content at that time. For example, the function can stipulate that—irrespective of the display content—the third object in a list or the object at the top on the right should always be selected.

By way of example, a global input gesture may comprise the simultaneous touching of the touch-sensitive surface in different areas. In particular, it is possible to detect the simultaneous touching of the surface with a plurality of fingertips. In particular, a global input gesture comprises the simultaneous touching of at least three different areas of the touch-sensitive surface. In this case, the touch-sensitive surface or the input apparatus which comprises this surface is designed such that the simultaneous touching of different areas can be detected and evaluated. Furthermore, a movement of an object or of a plurality of objects, such as a finger or a plurality of fingers, which is carried out on the touch-sensitive surface, can be detected and can be associated with a global input gesture. The global input gesture may, for example, correspond to a script which is written on the touch-sensitive surface and is associated with a number. By way of example, the user can write a number with his fingertip on the touch-sensitive surface.

In the disclosed method, the inputting of a global input gesture is identified independently of possible other input options which are associated with the menu displayed at that time. For example, even if an area of the touch-sensitive surface which is associated with a switching area of the menu displayed at that time is touched when inputting the global input gesture, this input is not associated with the operation of the switching area, but with the global input gesture. In this case, use is made in particular of the fact that the touch-sensitive surface is touched at the same time in a plurality of areas, thus making it possible to distinguish between inputs in which the touch-sensitive surface is touched in only one area at one time.

According to one disclosed embodiment of the method, a submenu is associated with at least some of the objects. The submenu associated with an object is displayed in the disclosed method when the global input gesture associated with this object has been detected. The function which is associated with the global input gesture is in this case the display of a specific submenu. In particular, the submenus are submenus of the objects in a main menu. This relates to one of the basic functions which can be controlled by the method.

In order to allow a global input gesture to be distinguished from other inputs more easily, it is possible in the disclosed method for a separate input to be carried out before carrying out the global input gesture, which separate input indicates that the next input will be a global input gesture. In this case, the global input gesture must be carried out within a time interval after the separate input. This refinement of the disclosed method makes it possible to reliably avoid confusion with other inputs.

According to another disclosed embodiment of the method, an area for carrying out the global input gesture is defined on the touch-sensitive surface. In this case, the position and/or size of the area may be defined as a function of the display content at that time. This also makes it possible to prevent confusion resulting between global input gestures and other inputs.

Furthermore, the disclosed embodiments relate to a method for controlling a graphical user interface, wherein a menu is defined in which a function is associated with each of a plurality of objects in the menu, and a different number is in each case associated with at least some of the objects, and a global input gesture is in each case associated with those of the objects, wherein the input gesture can be carried out on a touch-sensitive surface of an input apparatus. In the method, a global input gesture which is carried out on the touch-sensitive surface is detected and is associated with a number.

Thereafter, a function is carried out which is associated with that object in the menu displayed at that time with which the number is associated.

This disclosed embodiment of the method can be used in particular when only a manageable number of objects are in each case associated with various menus. If, in particular, only five objects or less than five objects are associated with global input gestures in conjunction with the menus, the input gesture may, for example, comprise the simultaneous touching of various areas on the touch-sensitive surface, with the number of delineated areas corresponding to the number which is associated with the input gesture. In this case, in particular, the user can touch the touch-sensitive surface with his fingertips, in which process he can use the number of fingertips which touch the touch-sensitive surface to define which object should be selected in each menu.

Furthermore, in this case, it is also possible for the global input gesture to correspond to a script which is written on the touch-sensitive surface and corresponds to a number associated with the input gesture.

According to another disclosed embodiment of the method, at least one further menu is defined, in which a function is associated with each of the plurality of objects in the further menu. A different number is in each case associated with at least some of the objects in the further menu, and a global input gesture is in each case associated with these objects in the further menu. In this refinement of the disclosed method, a function is carried out which is associated with the object in the menu being displayed at that time which is associated with the number. An input gesture is therefore associated with a number which can be interpreted for a multiplicity of menus such that the object associated with the number in the menu being displayed at that time is selected, and the corresponding function is carried out.

The control apparatus according to one disclosed embodiment for a graphical user interface comprises a display apparatus having a display area and a control device by means of which the display contents shown on the display area can be controlled. Display contents relating to a menu can be produced by means of the control device, in which menu a function is associated with each of a plurality of objects in the menu, wherein a global input gesture is in each case associated with at least some of the objects. The control apparatus furthermore comprises an input apparatus, which comprises a touch-sensitive surface by means of which the global input gesture which has been carried out on the touch-sensitive surface can be detected. In this case, a function can be carried out by means of the control apparatus, independently of the display content being shown on the display area at that time, which function is associated with the object which is in turn associated with a global input gesture which has been detected by means of the input apparatus.

According to another disclosed embodiment, a different number is in case associated with at least some of the objects in the control apparatus, and a global input gesture is in each case associated with these objects. In this case, a function can be carried out by means of the control apparatus, which function is associated with the object in the menu being shown at that time, which object is in turn associated with the number which is associated with a global input gesture which has been detected by means of the input device.

In particular, the input device of the disclosed control apparatus is designed such that the simultaneous touching of different areas of the touch-sensitive surface can be detected. In this case, the touch-sensitive surface can be provided independently of the display area, thus providing a so-called touchpad. Furthermore, the touch-sensitive surface can be formed on the display area, thus providing a so-called touch screen. The touchpad or the touch screen is a so-called multi-touchpad or a multi-touch screen, on which simultaneous touching by a plurality of fingertips can be detected and can be interpreted.

The disclosed embodiments of the method are used in particular for controlling a graphical user interface which assists the control processes for vehicle devices. The disclosed control apparatus is, in particular, accommodated in a vehicle. In this case, the display area is arranged such that it can be viewed by the vehicle occupants, in particular by the driver of the vehicle. Furthermore, the touch-sensitive surface of the input apparatus is arranged such that it can be touched by the fingertips of vehicle occupants, in particular of the driver of the vehicle.

BRIEF DESCRIPTION OF THE DRAWINGS

The disclosed embodiments will now be explained with reference to the drawings.

DETAILED DESCRIPTION

Figure 1:
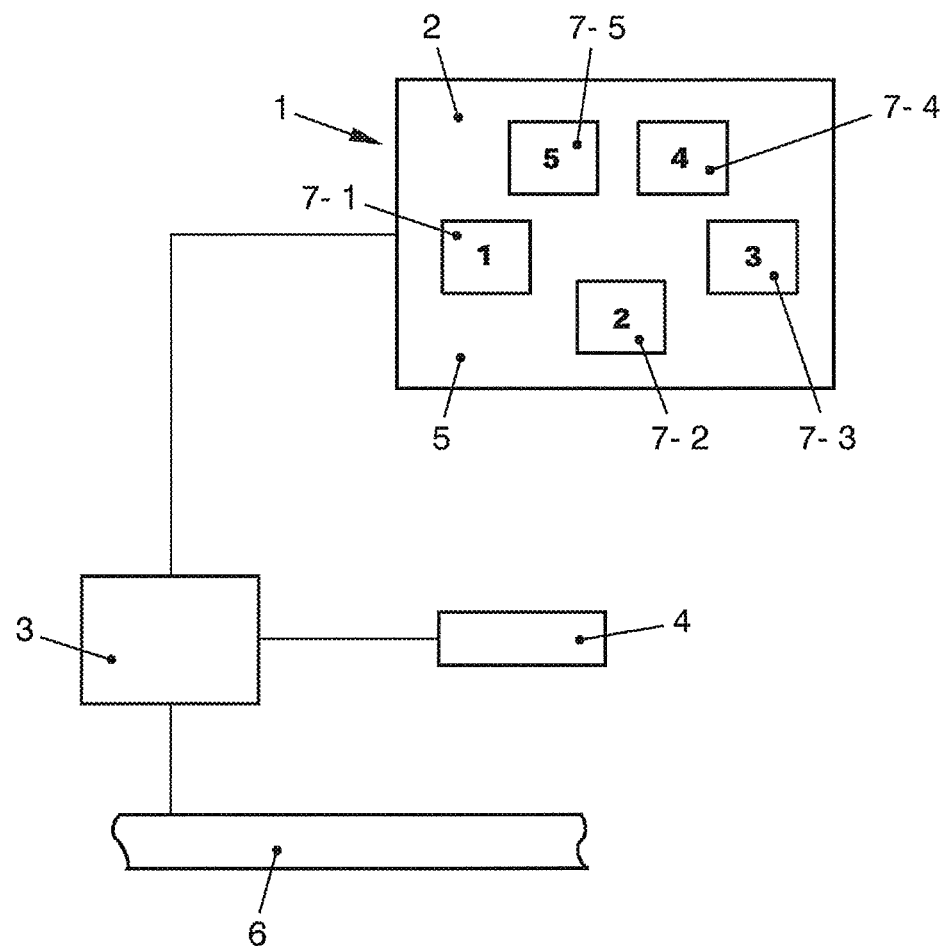
FIG. 1 shows the schematic design of one disclosed embodiment of the apparatus, and the coupling of this apparatus to other devices in the vehicle.

The disclosed embodiments of control apparatuses and methods for controlling a graphical user interface described in the following text are used in particular in a vehicle. However, they could also be used for graphical user interfaces which are used in conjunction with other devices, in particular mobile appliances. However, when used in a vehicle, this results in the particular advantage that the method and the control apparatus provide very rapid access to basic functions of the vehicle. This makes it possible to reduce to a minimum level possible distraction of the driver when controlling devices in the vehicle. Furthermore, the user can access the basic functions of the vehicle very quickly.

The control apparatus comprises a display apparatus 1 having a display area 2 which is arranged in the interior of the vehicle such that it can be seen well by at least one vehicle occupant, in particular the driver. The display area 2 provides the graphical user interface which can be controlled by means of the method or the control apparatus. The display area 2 can be provided by a display, in particular a liquid crystal display, of any desired type. The display apparatus is coupled to a control device 3.

The control device 3 produces graphical data which can be displayed by means of the display apparatus 1. For this purpose, the control apparatus is connected to a memory 4 for storage of data. In particular, the data may be structured by means of hierarchical menus. Each menu in this case comprises a plurality of objects, with which one function is in each case associated. In particular, the objects may be selectable switching areas.

For the purposes of the disclosed embodiments, a switching area means a control element of a graphical user interface. A switching area differs from elements and areas for pure information display, so-called display elements or display areas, in that they can be selected. When a switching area is selected, a function associated with it is carried out. The function may lead only to a change in the information display. Furthermore, the switching areas can also be used to control devices whose control is assisted by the information display. The switching areas can therefore replace conventional mechanical switches. The switching areas can be produced and displayed in any desired manner on a freely programmable display area. Furthermore, it is possible for the switching area to be marked. In this case, the associated function is not carried out at this stage. However, the marked switching area is displayed in an emphasized form in comparison to other switching areas. The marking and/or selection of a switching area can be carried out by means of cursor control or by direct operation of a touch-sensitive surface 5 in the display area.

By way of example, FIG. 1 shows a menu which comprises five objects 7-1 to 7-5 in the form of switching areas (the objects 7-1 to 7-5 are also referred to in a general form in the following text as an object 7 or objects 7). In particular, the menu shown in FIG. 1 is the basic main menu of the graphical user interface of the vehicle. The objects 7 relate to the basic functions of the vehicle which, for example, may comprise the climate-control settings, the navigation system, the communication devices and multimedia devices.

As shown in FIG. 1, the individual objects 7 are annotated with the numbers 1 to 5. These numbers are displayed in conjunction with the objects 7 on the display area 2. Furthermore, the objects 7 may contain graphical or alphanumeric elements, which visualize the function which is associated with the respective object 7.

Furthermore, the control device comprises an input apparatus which, in the present exemplary embodiment, has a touch-sensitive surface 5. In the exemplary embodiment shown in FIG. 1, the touch-sensitive surface 5 is formed on the display area 2. The display apparatus 1 therefore comprises a touch screen. In particular, the simultaneous touching of different areas can be detected on the touch-sensitive surface 5 of the display area 2. This is therefore a so-called multi-touch screen.

Alternatively, the touch-sensitive surface may also be provided separately from the display area 2. In this case, the input apparatus therefore comprises a touchpad, in particular a multi-touchpad.

Furthermore, the control device 3 is coupled to a vehicle bus 6 via which data can be interchanged between the wide range of devices in the vehicle. The control of these devices may be assisted by the display on the display area 2. Furthermore, these devices may be controlled by means of the input apparatus, in particular the touch-sensitive surface 5.

Figure 3:
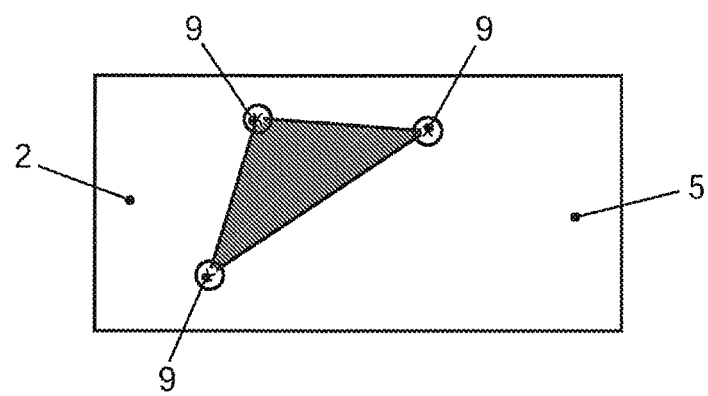
Figure 4:
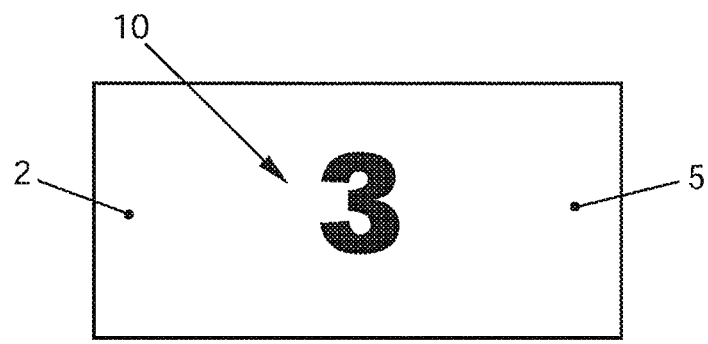
FIG. 4 shows the input of a global input gesture in a different manner.

A first disclosed embodiment of the method, and which can be carried out by means of the control apparatus described above, will be explained in the following text with reference to FIGS. 2 to 4.

The data stored in the memory 4 is stored as a hierarchical menu structure. The menus associated with this hierarchical menu structure can be displayed by means of the control device 3 on the display area 2. In the highest hierarchy level, a main menu is displayed, which contains the objects 7-1 to 7-5. A specific function is associated with each of the objects 7, in the present case the calling of a submenu. For example, when the main menu is displayed as illustrated in FIG. 1, if the user selects the object 7-1 by, for example, touching the touch-sensitive surface 5 in the area of the object 7-1, a submenu is displayed which is associated with the object 7-1. The submenus relating to the other objects 7-2 to 7-5 can be selected in a corresponding manner.

Furthermore, input gestures are associated with the objects 7. When a global input gesture is input on the touch-sensitive surface 5, a function associated with the corresponding object 7 can be carried out independently of the display content being shown at that time on the display are 2, that is to say also independently of the menu displayed at that time.

In the illustrated exemplary embodiment, one of the numbers 1 to 5 is associated with each of the objects 7. In this case, the touching of the touch-sensitive surface 5 in a delineated area, for example with just one fingertip, is associated as a global input gesture with the object 7-1, with which the number 1 is associated. The simultaneous touching of the touch-sensitive surface 5 in two delineated areas, for example with two fingertips, is associated as a global input gesture with the object 7-2, which is associated with the number 2. Correspondingly, the simultaneous touching of the touch-sensitive surface 5 in three, four or five delineated areas, for example with three, four or five fingertips, is associated as global input gestures with the objects 7-3, 7-4 and 7-5, with which the numbers 3, 4 and 5 are associated.

On the basis of the display of the main menu with the objects 7 as shown in FIG. 1, the user can first of all navigate in any desired manner by a selection of switching areas within the hierarchical menu structure in a manner known per se. Independently of the menu in which the user is located within the hierarchical menu structure, the user can select one of the objects 7 from the main menu at any time by inputting a global input gesture, as a result of which the corresponding submenu relating to the object 7 is called up directly by inputting the global input gesture. The global input gesture therefore represents a rapid-access function (shortcut).

Figure 2:
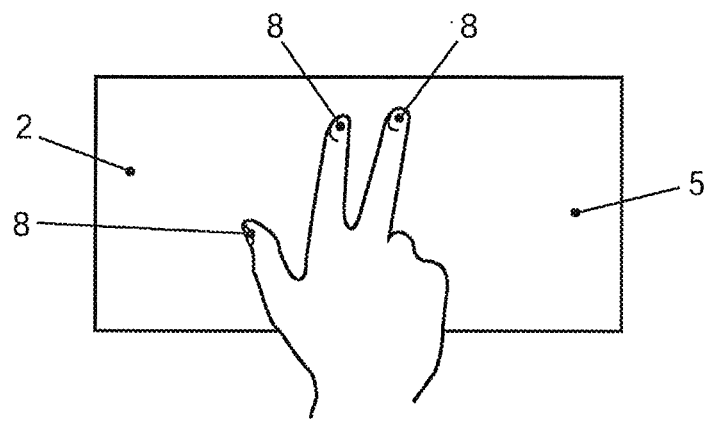
FIGS. 2 and 3 show the input of a global input gesture.

By way of example, in FIG. 2, the user is touching the touch-sensitive surface 5 at three positions with the fingertips 8 at the same time, with any desired display within the hierarchical menu structure. As is shown in FIG. 3, the control device 3 detects the positions 9 at which the touch-sensitive surface 5 has been touched at the same time. Simultaneous touching in three delineated areas can be interpreted by the control device 3 directly as a global input gesture which is associated with the object 7-3. Furthermore, the control device can first of all investigate the relative positions of the positions 9 and can determine whether the three positions 9 can be associated with a global input gesture for which the touch-sensitive surface 5 has been touched by three fingertips 8 at the same time. Once the global input gesture has been detected, the function which is associated with the object 7-3 is carried out independently of the display content shown at that time on the display area 2, since this object is associated with the detected input gesture. Therefore, in the present case, the submenu which is associated with the object 7-3 is called up and displayed.

Furthermore, a further global input gesture can be associated with each of the objects 7, offering the user a further option for calling up the function which is associated with the respective object 7 directly, that is to say independently of the display content being shown at that time on the display area 2. In this case, the global input gesture is a script which is written on the touch-sensitive surface 5 and corresponds to a number which is associated with the object 7. By way of example, FIG. 4 shows the user using his fingertip 8 to write the script 10 for the number three. This script 10 is interpreted as a global input gesture which is associated with the object 7-3. Correspondingly, the user can also write one of the other numbers one to five as script 10 on the touch-sensitive surface 5, in order to call up a function which is associated with one of the objects 7.

In order to make it easier to distinguish between global input gestures and other inputs which are carried out in conjunction with menus, it is possible in the case of a global input gesture for the touch-sensitive surface 5 to always be touched at the same time in at least three delineated areas. Furthermore, a separate input can be carried out before carrying out the global input gesture, which indicates that the next input will be a global input gesture. The separate input may, for example, be carried out on a separate switching area, which is appropriately identified. The global input gesture must then be carried out within a time interval after the separate input.

Figure 5:
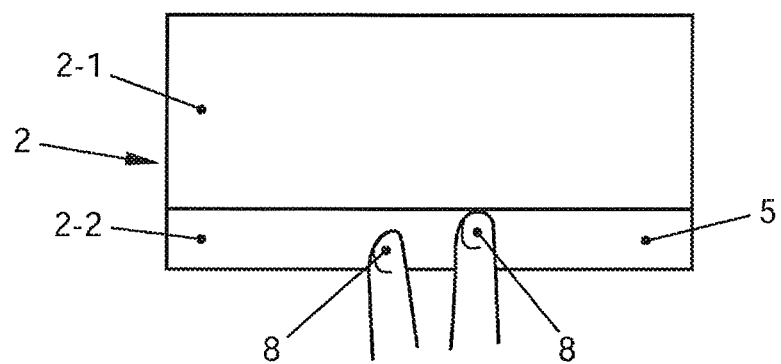
FIG. 5 shows a refinement of the display area, which is used in disclosed embodiments.

Furthermore, as is shown in FIG. 5, the display area 2 can be subdivided into two areas 2-1 and 2-2: the area 2-1 is used for conventional display of information items and of menus. The display area 2-2 is reserved for inputting global input gestures. This display area 2-2 is provided with the touch-sensitive surface 5. By way of example, the user can use this area 2-2 to carry out the global input gesture by means of his fingertips 8. The position and/or the size of this area 2-2 need not always be defined in an identical manner. The position and/or the size may also be defined as a function of the display content at that time, which is being shown on the display area 2.

A second disclosed embodiment of the method will be described in the following text, which can also be carried out by the control apparatus described above with reference to FIG. 1.

As in the case of the first exemplary embodiment, a multiplicity of menus are stored in a hierarchical menu structure in the memory 4. In this case, a multiplicity of menus comprises lists with a plurality of objects 7 (the list entries). The objects 7 in the various menus may, however, differ. In the case of multimedia applications, for example, a list may comprise different pieces of music, or radio station numbers. If the global input gesture is carried out by simultaneously touching the touch-sensitive surface 5 with the fingertips 8 on a user's hand, the number of objects in a list is limited to five or less.

As in the first exemplary embodiment, the objects 7 are each identified by numbers. In this case as well, the graphic symbols or further alphanumeric information items can furthermore visualize the function of the corresponding object 7.

In the second exemplary embodiment, a number is in each case associated with a global input gesture and is in turn associated with a specific object 7 in a menu. However, when a global input gesture is carried out in this case, the function of a specific object 7 in the main menu is not called up as in the case of the exemplary embodiment described above, but the function is carried out which is associated with the object 7 in the menu displayed at that time which is associated with the number which is associated with the global input gesture. In this case, the simultaneous touching of the touch-sensitive surface 5 in three delineated areas is associated with the number 3, the simultaneous touching in four delineated areas is associated with the number 4, and the simultaneous touching in five delineated areas is correspondingly associated with the number 5. In each menu which contains a list, the touching of the touch-sensitive surface 5 with three fingertips 8 can therefore lead to the third object 7 being called up. In the same way, the simultaneous touching with four fingertips 8 can lead to the fourth object being called up. Correspondingly, the respective number, as has been explained above with reference to FIG. 4, can also be entered by means of a script 10.

Furthermore, a separate area 2-2 can be provided for inputting a global input gesture, as has been explained with reference to FIG. 5. Finally, a separate input can also be carried out before the actual input of the global input gesture, in order to identify the subsequent input within a time interval as a global input gesture.

Figures 6A, 6B, 6C:
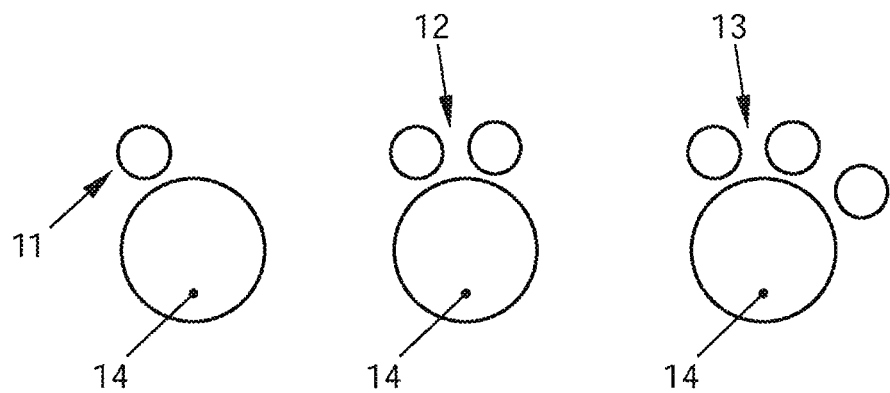
FIGS. 6A to 6C show markings on objects, which visualize an associated global input gesture.

Objects which can be selected by means of global input gestures may be appropriately marked. FIGS. 6A to 6C show objects 14 which are provided with a marking 11, a marking 12 and a marking 13, respectively. The marking 11 indicates that the number 1 or the touching of the touch-sensitive surface 5 with one finger is associated as a global input gesture with the object 14. The marking 12 indicates that the number 2 or the simultaneous touching of the touch-sensitive surface 5 with two fingertips 8, is associated with the object 14. The marking 13 indicates that the number 3 or the simultaneous touching of the touch-sensitive surface 5 with three fingertips 8 is associated with the object 14.

LIST OF REFERENCE NUMBERS

1 Display apparatus
2 Display areas
3 Control device
4 Memory
5 Touch-sensitive surface
6 Vehicle bus
7 Objects
8 Fingertips
9 Positions on the touch-sensitive surface 5
10 Script
11 Marking
12 Marking
13 Marking
14 Object

The invention claimed is:

1. A method for controlling a graphical user interface, the method comprising:
defining a menu in which a function is associated with each of a plurality of objects in the menu;
associating a global input gesture, in each case, with at least one of the plurality of objects, wherein the global input gesture is carried out on a touch-sensitive surface of an input apparatus;
displaying various display contents on a display area, such that the global input gesture, which is carried out on the touch-sensitive surface is detected; and
carrying out a function associated with the object associated with the detected input gesture independently of the display content being shown on the display area at that time,
wherein, the global input gesture is distinguished from other inputs into the graphical user interface by detecting a separate input entered into the graphical user interface before the global input gesture, which separate input requires that the next input that is input into the graphical user interface is processed as a global input gesture, provided the next input is carried out within a time interval after the separate input.

2. The method of claim 1, wherein the global input gesture comprises simultaneous touching of different areas of the touch-sensitive surface.

3. The method of claim 2, wherein the global input gesture comprises the simultaneous touching of at least three different areas of the touch-sensitive surface.

4. The method of claim 1, wherein the global input gesture corresponds to a script written on the touch-sensitive surface and associated with a number.

5. The method of claim 1, further comprising associating a submenu with at least one of the objects, wherein the submenu is displayed when the input gesture associated with at least one object has been detected.

6. The method of claim 1, wherein the area for carrying out the global input gesture is defined on the touch-sensitive surface.

7. The method of claim 6, wherein a position and/or size of the area is defined as a function of displayed content at that time.

8. The method of claim 1, wherein the global input gesture is also distinguished from other inputs into the graphical user interface by designating an area within the touch-sensitive surface to be specific to global input gestures.

9. A method for controlling a graphical user interface, the method comprising:
 defining a menu in which a function is associated with each of a plurality of objects in the menu;
 associating a different number, in each case, with at least one of the plurality of objects;
 associating a global input gesture with each of the plurality of the objects, wherein the global input gesture is carried out on a touch-sensitive surface of an input apparatus;
 detecting a global input gesture carried out on the touch-sensitive surface and associating the detected global input gesture with the associated number, and performing a function associated with the at least one menu object with which the associated number is associated,
 wherein, the global input gesture is distinguished from other inputs into the graphical user interface by detecting a separate input entered into the graphical user interface before the global input gesture, which separate input requires that the next input that is input into the graphical user interface is processed as a global input gesture, provided the next input is carried out within a time interval after the separate input.

10. The method of claim 9, wherein the global input gesture comprises the simultaneous touching of a number of different areas of the touch-sensitive surface, wherein the number of areas corresponds to the number which is associated with the input gesture.

11. The method of claim 9, wherein the global input gesture corresponds to a script which is written on the touch-sensitive surface and corresponds to a number associated with the global input gesture.

12. The method of claim 9, further comprising: defining at least one further menu, in which a function is associated with each of a plurality of objects in the further menu; associating a different number, in each case, with at least some of the objects in the further menu, wherein a global input gesture is associated with each of the objects in the further menu; and performing a function associated with a displayed menu object.

13. The method of claim 9, wherein the global input gesture is also distinguished from other inputs into the graphical user interface by designating an area within the touch-sensitive surface to be specific to global input gestures.

14. A control apparatus for a graphical user interface, the control apparatus comprising:
 a display apparatus with a display area that displays a menu,
 a control device configured to control display contents shown on the display area, wherein a function is associated with each of a plurality of objects in the menu is associated with a function, wherein a global input gesture, in each case, is associated with at least one of the plurality of objects in the menu, and
 an input apparatus, which comprises a touch-sensitive surface configured to detect a global input gesture performed on the touch-sensitive surface,
 wherein the control device is configured to perform a function, associated with a detected global input gesture, independently of the display content on the display area shown at that time,
 wherein, the global input gesture is distinguished from other inputs into the graphical user interface by detecting a separate input entered into the graphical user interface before the global input gesture, which separate input requires that the next input that is input into the graphical user interface is processed as a global input gesture, provided the next input is carried out within a time interval after the separate input.

15. The control apparatus of claim 14, wherein the input apparatus is configured to detect simultaneous touching of different areas of the touch-sensitive surface.

16. The control apparatus of claim 14, wherein the global input gesture is also distinguished from other inputs into the graphical user interface by designating an area within the touch-sensitive surface to be specific to global input gestures.

17. A control apparatus for a graphical user interface, the control apparatus comprising:
 a display apparatus with a display area;
 a control device configured to control display contents shown on the display area, wherein the control device controls production of display contents relating to a menu, in which menu, a function is, in each case, associated with a plurality of objects in the menu, wherein a different number, is in each case, associated with at least one of the plurality of objects, and a global input gesture is in each case, associated with the objects associated with numbers, and
 an input apparatus, which comprises a touch-sensitive surface configured to detect the global input gesture which has been carried out on the touch-sensitive surface,
 wherein the control device is configured to perform a function associated with the menu object shown at that time, which associated menu object being also associated with the number associated with the detected global input gesture,
 wherein, the global input gesture is distinguished from other inputs into the graphical user interface by detecting a separate input entered into the graphical user interface before the global input gesture, which separate input requires that the next input that is input into the graphical user interface is processed as a global input gesture, provided the next input is carried out within a time interval after the separate input.

18. The control apparatus of claim 17, wherein the input apparatus is configured to detect simultaneous touching of different areas of the touch-sensitive surface.

19. The control apparatus of claim 17, wherein the global input gesture is also distinguished from other inputs into the graphical user interface by designating an area within the touch-sensitive surface to be specific to global input gestures.

* * * * *